Figure 5:
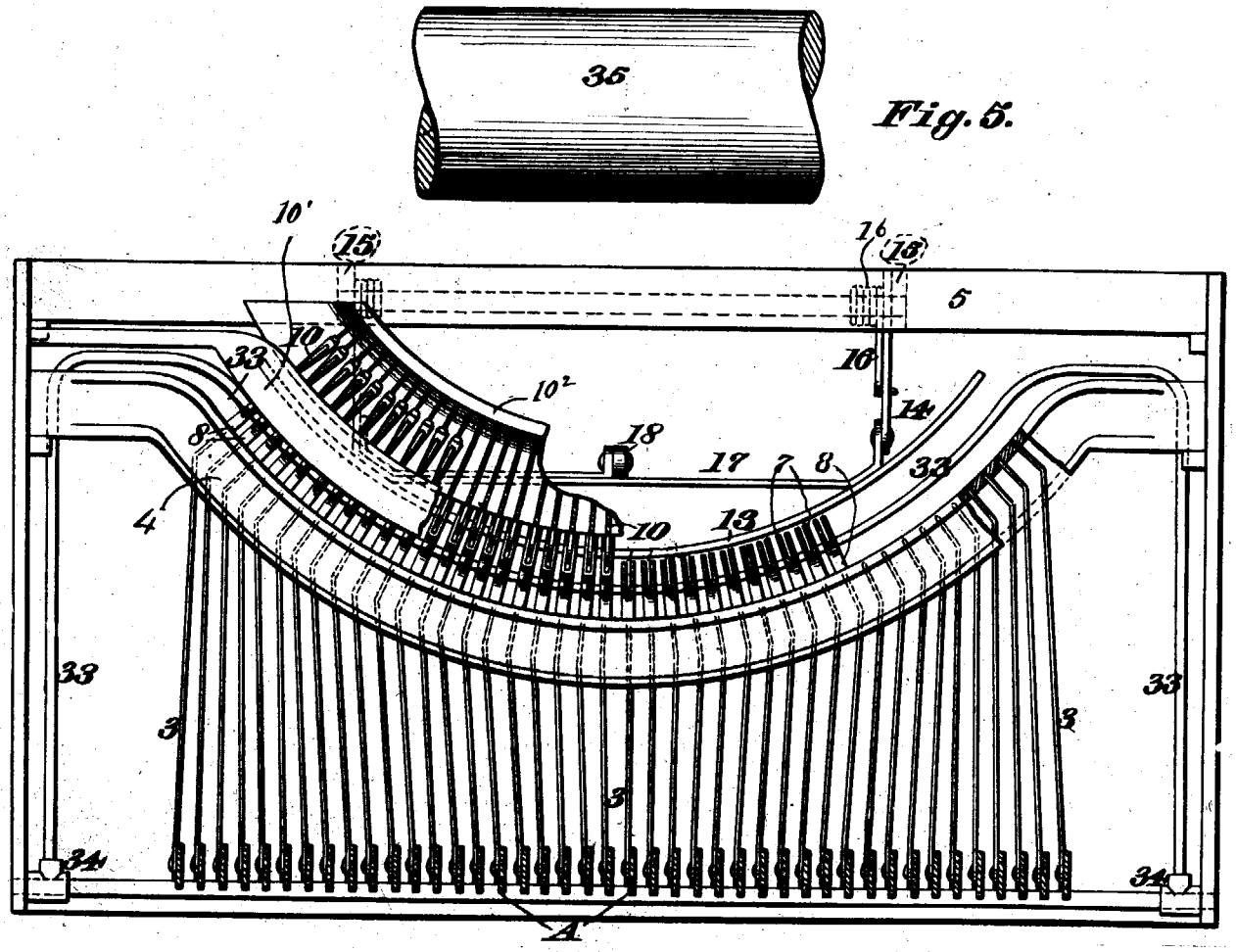

July 3, 1923. Re. 15,640
M. C. CRAWLEY
POWER TYPEWRITER
Original Filed Oct. 28, 1911 2 Sheets-Sheet 1
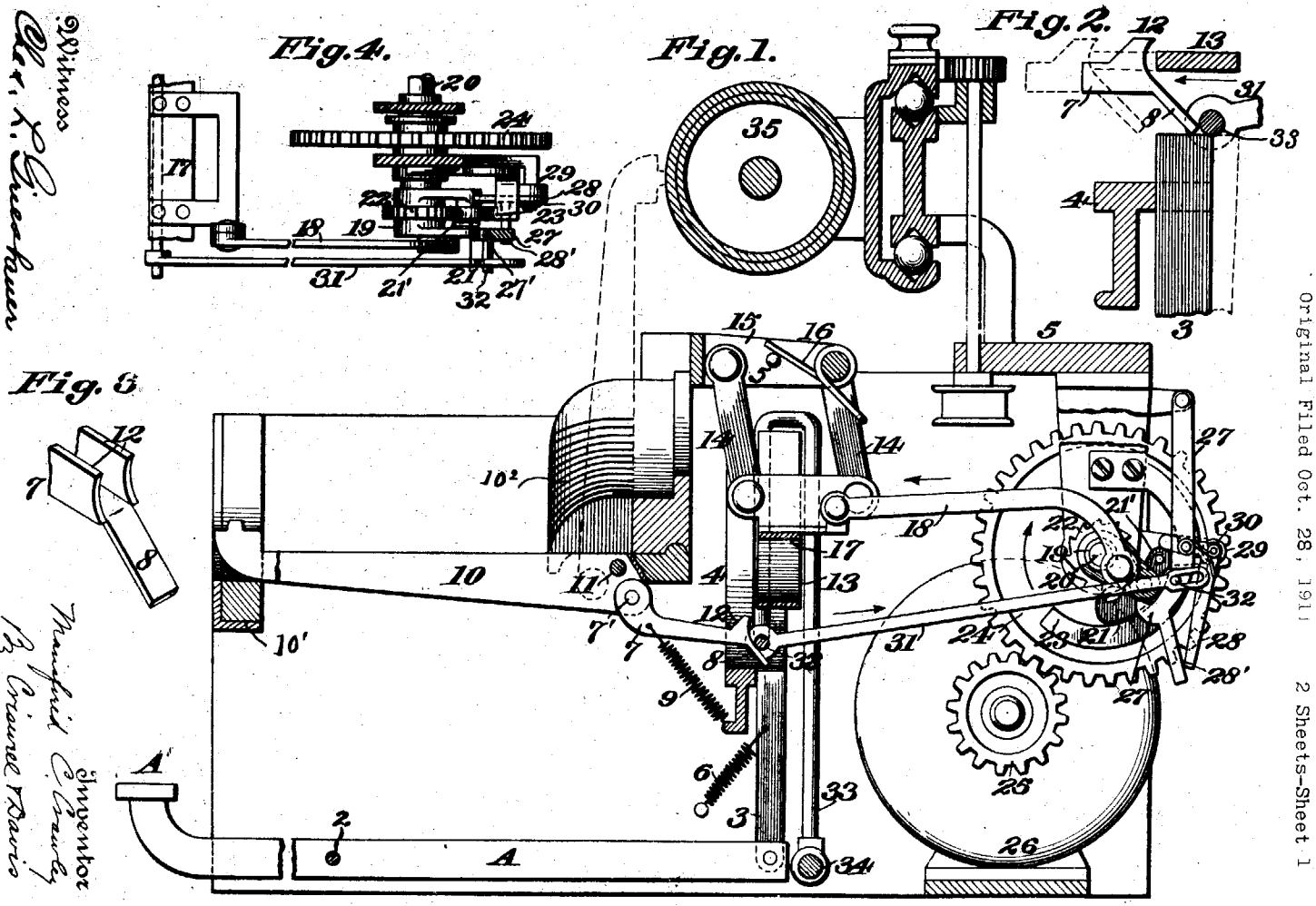
Witness
Chas. L. Gueskauer
Inventor
Manfred C. Crawley
By Crisurel & Davis
Attorneys July 3, 1923.

Re. 15,640

M. C. CRAWLEY

POWER TYPEWRITER

Original Filed Oct. 28, 1911 2 Sheets-Sheet 2

Witness
Chas. L. Griesbauer.

Inventor
Manfred C. Crawley

By
Criswell & Davis
Attorneys

Reissued July 3, 1923.

Re. 15,640

UNITED STATES PATENT OFFICE.

MANSFIELD C. CRAWLEY, OF RUTHERFORD, NEW JERSEY, ASSIGNOR TO ADDOGRAPH COMPANY, OF LOS ANGELES, CALIFORNIA, A CORPORATION OF CALIFORNIA.

POWER TYPEWRITER.

Original application filed October 28, 1911, Serial No. 657,311. Divided and application filed December 17, 1912, Serial No. 737,225. Original No. 1,156,061, dated October 12, 1915. Application for reissue filed September 25, 1917. Serial No. 193,212.

*To all whom it may concern:*

Be it known that I, MANSFIELD C. CRAWLEY, a citizen of the United States, and resident of Rutherford, county of Bergen, and State of New Jersey, have invented certain new and useful Improvements in Power Typewriters, of which the following is a specification.

This invention has relation to typewriting machines in which a power device is employed for actuating the type-bars, and this application is a division of my application Serial No. 657,311, filed October 28, 1911.

The invention consists of the parts, and the combination and construction of parts as will be hereinafter more fully described and claimed, having reference to the accompanying drawings, in which—

Figure 1 is a longitudinal section of the invention, partly in elevation. Fig. 2 is a detail of the type and digit-bar operating mechanism. Fig. 3 is a detail in perspective of the end portion of the type bar actuating arm. Fig. 4 is a detail in plan of the operative mechanism for returning the type bar actuator to normal position. Fig. 5 is a front elevation of the machine with parts broken away.

In the drawings, A represents a key lever of the typewriting mechanism, which is provided with the usual depressing button A′, and is fulcrumed at 2.

The inner end of the key lever A is pivotally connected to a vertically disposed operating arm 3, the upper end of which is guided in, and adapted to pass through, a slot formed in a stationary segment 4, mounted on the frame 5 of the machine. A spring 6 mounted on the operating arm 3, normally retains the latter in its lowermost position.

There are as many key levers A and operating arms 3 provided, as just described, as there are keys or buttons A′ on the typewriting portion of the machine.

Disposed above the upper end of the operating arm 3, above the segment 4, is a type bar actuating arm 7, the lower end of which extends downward at 8 and is normally held in contact with the segment 4 by means of a spring 9.

The upper end of the arm 7 is pivoted to the short arm of the type bar 10 in close proximity to the fulcrum point 11 of the latter. The lower end of the arm 7 is also provided with a hooked portion 12 which is adapted to be engaged by a reciprocating segmental actuating bar 13, when the lower end 8 of the arm 7 is moved upward by operating the arm 3, as later described and as shown in Fig. 2. The usual type-bar rest is designated 10′ and the usual type-bar segment $10^2$.

The actuating bar 13 is carried by means of links 14 from rearwardly extending brackets 15 mounted on a rigid portion of the frame 5. A stiff spring 16 normally bears against the back of one or more of the links 14 adjacent the brackets 15 and tends to move and retain the actuating bar 13 in its forwardmost position, as indicated in dotted lines in Fig. 2.

Means are provided for normally retaining the actuating bar 13 in its rearward position in opposition to the tension of the spring 16, which means is adapted to be operated by the depression of a key A to release the actuating bar 13 and permits its being carried forward by the spring 16. The above-mentioned means are constructed as follows: Pivotally mounted on a bracket 17 on the actuating bar 13 is a link 18, which extends rearward of the bar 13 and connects with a crank 19 loosely mounted on a shaft 20. The outer end of the crank 19 carries a pawl 21 which is adapted to be engaged with, and disengaged from, a ratchet 22 rigidly mounted on the shaft 20. The pawl 21 is held out of contact with the ratchet 22 when the bar 13 is in its rearwardmost position by means of a stationary cam 23 mounted on a hanger on the frame 5, on which cam the outer end of the pawl 21 is designed to ride, as later described. When the pawl 21 is disengaged from the ratchet 22, the crank 19 is free to move or be held stationary, independent of the revoluble shaft 20 on which it is mounted and which shaft is adapted to be constantly rotated through gears 24 and 25, by means of a motor 26.

It will be seen that, by obstructing the crank 19 at a point corresponding to the position it will assume when the actuating bar 13, carrying the link 18, is in its rearwardmost position, the actuating bar 13 will be prevented from being moved forward, and that by relieving the crank 19 at this point the spring 16 will carry the bar 13 forward with considerable velocity.

The mechanism for locking the crank 19 consists of a depending pawl or dog 27, pivoted at its upper end to the frame 5, the crank engaging member 27′ of which is normally disposed in the path of travel of the outer end of the crank 19 in such manner as to prevent further movement of the latter when it reaches this point, as later described. The dog 27 is normally retained in its crank engaging position, by means of a spring actuated bell-crank lever 28, which is pivoted at 29 to a fixed member on the frame 5, and has a projection 28′ on its lower end which bears against the back of an extended portion of the dog 27. A spring 30, is wound around a stud on the lever 28 and bears between a rigid pin and the lever 28 in such manner as to exert an inward pressure on the lower end of the lever 28.

The device for releasing the dog 27 from engagement with the crank 19, comprises a link 31, one end of which is provided with a slot into which a pin 32 on the dog 27 extends, and the other end of which engages a curved releasing bar 33 which is located between the segment 4 and the actuator bar 13 in contact with the upper face of the downwardly extending portion 8 on each of the type-bar actuating-arms 7. The bar 33 is here shown as extending downward at each end and pivoted at 34 at a point against the key lever A, but any other manner of mounting the bar 33 by which it can have a certain transverse reciprocal or oscillatory movement, may be employed if desired.

In operating the typewriter mechanism just described, a button A′ is depressed, thereby rocking the key-lever A on its pivotal mounting 2 so as to move the operating arm 3 upward through the guide slot in the stationary segment 4. This brings the upper end of the operating arm 3 into contact with the downwardly inclined end 8 of the arm 7, thus moving the latter upward on its pivotal mounting 7′ so as to dispose the hook 12 in front of the actuating-bar 13, as shown in Fig. 2. As the inclined portion 8 of the arm 7 moves upward, the bar 33 is moved backward by reason of the inclined portion 8 bearing against the bar at a point 45° from its center, thus acting as a wedge to move the bar 33 backward on its pivotal mountings 34. The rearward movement of the bar 33 carries the slotted link 31 rearward therewith, so as to throw the projection 27′ on the lower end of the dog 27 out of engagement with the crank 19, which permits the latter to rotate on the shaft 20 and thus release the bar 13. The bar 13 is then caused to move forward by means of the tension of the springs 16 bearing against the links 14, the link 18 pulling upon the loose crank 19 to carry the pawl 21 over the cam surface 23, the cam 23 permitting the pawl 21 to travel free from engagement with the ratchet 22 while the bar 13 is moving in a forward direction. The springs 16 act on the link 14 to impel the actuating bar 13 forward with considerable velocity, the forward movement of the bar 13 acting to impel the type bar 10 upward against the platen roll 35 through the arm 7 which has been previously disposed in front of the movable bar 13, as before described. A uniform impact of all the type in the machine on the platen roll is insured for the reason that one spring or set of springs 16 control the forward movement of the actuator-bar 13, which bar operates on all the type bars. The moment the impression is made by the type bar 10, the spring 9 returns it and the arm 7 to the normal position shown in Fig. 1. In the meantime, the pawl 21 has been carried clear of the cam 23 by means of the link 18 and crank 19, which are carried forward by the actuating bar 13. The moment the pawl 21 is released from the cam 23 a spring 21′, on the pawl throws it into engagement with the rotating ratchet wheel 22 on the shaft 20, so that as the ratchet revolves the crank 19 will be carried therewith, thus pulling upon the link 18 to return the bar 13 back to its normal position, in opposition to the spring 16 where it is retained by the dog 27, reengaging the crank 19. The moment the crank 19 is engaged by the dog 27, the heel of the pawl 21 strikes the cam 23 which action rocks the pawl 21 and releases it from engagement with the ratchet 22, in which released position it is retained by the cam 23 until the crank 19 is again released from the dog 27 and is again moved forward by the springs 16, as before described. The moment the bar 13 starts back to its rearward position it releases the hook 12 on the arm 7, thereby allowing the spring 9 to pull the arm 7 downward until the lower end of the inclined portion 8 comes in contact with the slotted segment 4, the lower end 8 of the arm 7 moving rearward into contact with the edge of the actuating arm 3 extending through the segment 4, so as to move the latter rearward against the tension of the spring 6, as shown in dotted lines in Fig. 2, the spring 9 at the same time restoring the type bar 10 to normal. As this occurs, the spring 6 returns the arm 3 and key-lever A to normal, the upper end of the arm 3 passing beneath the lower end of the wedge-end 8 in position for another operation, and the releasing bar 33 assuming its former position over the inclined portion 8 of the arm 7.

The platen roll 35 is mounted on a carriage 36, which is adapted to travel back and forth on a trackway 37, as is common in typewriter construction. As the operation of the platen roller 35 and the carriage 36 forms no part of the present invention, the mechanism for operating the same is not here shown.

Having thus described my invention what I claim and desire to secure by Letters Patent is—

1. The combination with a series of type bars and a bank of key levers, of a reciprocating bar for actuating the type bars, spring means for advancing the bar, a rotary motor, and means operable by said motor to retract the bar.

2. The combination with a series of type bars and a bank of key levers, of a reciprocating bar for actuating the type bars, spring means for advancing the bar, a rotary motor, means operable by said motor to retract the bar, and means for retaining the bar in its rearmost position in opposition to the spring advancing means.

3. The combination with a series of type bars and a bank of key levers, of a reciprocating bar for actuating the type bars, spring means for advancing the bar, a rotary motor, means operable by said motor to retract the bar, means for retaining the bar in its rearmost position in opposition to the spring advancing means, means operable by a key lever for connecting a type bar to the reciprocating bar, and means actuated by said connecting means to release the bar.

4. The combination with a series of type bars and a bank of key levers, of an arm pivoted on each of the type bars, said arm having an inclined portion and a hooked portion on its outer end, a reciprocating actuating bar, spring members for advancing the actuating bar, and means operated by a key lever for disposing the hooked portion of said arm in the path of travel of the actuating bar.

5. The combination with a series of type bars and a bank of key levers, of an arm pivoted on each of the type bars, said arm having an inclined portion and a hooked portion on its outer end, a reciprocating actuating bar, a spring for advancing the actuating bar, a rotary motor, means operable by said motor to retract the actuating bar, and means for normally holding the actuating bar in its retracted position in opposition to the spring.

6. The combination with a series of type bars and a bank of key levers, of an arm pivoted on each of the type levers, said arm having an inclined portion and a hooked portion on its outer end, a reciprocating actuating bar, a spring for advancing the actuating bar, a rotary motor, means operable by said motor to retract the actuating bar, means for normally holding the actuating bar in its retracted position in opposition to the spring, and means by which the operation of a key lever will dispose the hooked portion of the arm in front of the actuating bar.

7. The combination with a series of type bars and a bank of key bars, of an arm pivoted on each of the type levers, said arm having an inclined portion and a hooked portion on its outer end, a reciprocating actuating bar, a spring for advancing the actuating bar, a rotary motor, means operable by said motor to retract the actuating bar, means for normally holding the actuating bar in its retracted position in opposition to the spring, means by which the operation of a key lever will dispose the hooked portion of the arm in front of the actuating bar, and means operable by said last-named means for releasing the actuating bar to allow it to be moved forward by the spring.

8. In a typewriting machine, the combination with a series of type bars and a bank of key levers, of a motor, a shaft driven continuously by said motor, a crank loose on said shaft, an actuating bar, means for operating the type bars by the actuating bar on the forward movement of the latter, a rod connecting said crank to said actuating bar, means for engaging the crank to the shaft to move the actuating bar rearwardly, and spring members for moving the actuating bar forwardly.

9. The combination with a series of type bars and a bank of key levers, of a motor, a shaft driven continuously by said motor, a crank loose on said shaft, an actuating bar, a rod connecting said crank to said actuating bar, means for engaging the crank to the shaft to move the actuating bar rearwardly, a spring for moving the actuating bar forwardly, and means by which the forward movement of the actuating bar will operate a type bar, said means comprising an arm on the type bar having a hooked portion engageable with the actuating bar.

10. The combination with a series of type bars and a bank of key levers, of a motor, a shaft driven continuously by said motor, a crank loose on said shaft, an actuating bar, a rod connecting said crank to said actuating bar, means for engaging the crank to the shaft to move the actuating bar rearwardly, means by which the forward movement of the actuating bar will operate a type bar, said means comprising an arm on the type bar having a hooked portion engageable with the actuating bar, and means for normally retaining the actuating bar in its rearward position in opposition to the spring members.

11. The combination with a series of type bars and a bank of key levers, of a motor, a shaft driven continuously by said motor, a crank loose on said shaft, an actuating bar, a rod connecting said crank to said actuating bar, means for engaging the crank to the shaft to move the actuating bar rearwardly, a spring for moving the actuating bar forwardly, means by which the forward movement of the actuating bar will operate a type bar, said means comprising an arm on the type bar having a hooked portion engageable with the actuating bar, and means for normally retaining the actuating bar in its rearward position in opposition to the spring, said means including a dog engageable with said crank to limit its movement.

12. The combination with a series of type bars and a bank of key levers, of a motor, a shaft driven continuously by said motor, a crank loose on said shaft, an actuating bar, a rod connecting said crank to said actuating bar, means for engaging the crank to the shaft to move the actuating bar rearwardly, a spring for moving the actuating bar forwardly, means by which the forward movement of the actuating bar will operate a type bar, said means comprising an arm on the type bar having a hooked portion engageable with the actuating bar, means operable by a key lever for throwing said hooked portion of the arm into engagement with the actuating bar, means for normally retaining the actuating bar in its rearward position in opposition to the spring, said means including a dog engageable with said crank to limit its movement, and means operable by the key lever for disengaging the dog from the crank.

13. The combination with a series of type bars and a bank of key levers, of a motor, a shaft driven continuously by said motor, a crank loose on said shaft, an actuating bar, a rod connecting said crank to said actuating bar, means for engaging the crank to the shaft to move the actuating bar rearwardly, including a ratchet on the shaft and a pawl on the crank engageable therewith, a spring for moving the actuating bar forwardly, means by which the forward movement of the actuating bar will operate a type bar, said means comprising an arm on the type bar having a hooked portion engageable with the actuating bar, means for normally retaining the actuating bar in its rearward position in opposition to the spring, said means including a dog engageable with said crank to limit its movement, and means operable by the key lever for disengaging the dog from the crank.

14. In a typewriting machine having a series of type bars, a series of key levers corresponding to the type bars, an actuating bar for operating the type bars, a rotary motor, means including a clutch mechanism operable by the movement of the actuating bar, by which the motor will move the actuating bar in one direction, spring means for moving the actuating bar in the other direction, and means operated from a key lever for controlling the operation of said spring means.

15. The combination of a key lever, a vertically movable operating arm pivoted thereto, stationary segment, a slot in the segment in which the operating arm is guided, yieldable means for normally retaining the upper end of the operating arm below the upper surface of the segment, a pivoted type bar, an actuating arm pivoted thereon, the outer end of said actuating arm positioned to be raised by the vertical movement of the operating arm, and spring operated means engageable with the actuating arm whereby the type bar will be rocked on its pivot.

16. The combination of a key lever, a vertically movable operating arm pivoted thereto, a stationary segment, a slot in the segment in which the operating arm is guided, yieldable means for normally retaining the upper end of the operating arm below the upper surface of the segment, a pivoted type bar, an actuating arm pivoted thereon, the outer end of said actuating arm positioned to be raised by the vertical movement of the operating arm, and spring operated means engageable with the actuating arm whereby the type bar will be rocked on its pivot, said spring operated means normally retained in a retracted position under tension and adapted to be released by the upward movement of the operating arm.

17. The combination of a key lever, a vertically movable operating arm pivoted thereto, a stationary segment, a slot in the segment in which the operating arm is guided, yieldable means for normally retaining the upper end of the operating arm below the upper surface of the segment, a pivoted type bar, an actuating arm pivoted thereon, the outer end of said actuating arm positioned to be raised by the vertical movement of the operating arm, a spring propelled actuator bar positioned to engage with the actuating arm when the latter is in its raised position, said actuator bar normally retracted under tension, and means operable through the upward movement of the operating arm for releasing the actuator bar to permit it to move forward and act on the actuating arm and thereby rock the type bar on its pivot.

18. The combination of a key lever, a vertically movable operating arm pivoted thereto, a stationary segment, a slot in the segment in which the operating arm is guided, yieldable means for normally retaining the upper end of the operating arm below the upper surface of the segment, a pivoted type bar, an actuating arm pivoted thereon, the outer end of said actuating arm positioned to be raised by the vertical movement of the operating arm, a spring propelled actuator bar positioned to engage with the actuating arm when the latter is in its raised position, links on which said actuator bar is suspended, a spring for advancing the actuator bar operative on said links, and means for normally retaining the actuator bar in a retracted position in opposition to the spring.

19. The combination of a key lever, a vertically movable operating arm pivoted thereto, a stationary segment, a slot in the segment in which the operating arm is guided, yieldable means for normally retaining the upper end of the operating arm below the upper surface of the segment, a pivoted type bar, an actuating arm pivoted thereon, the outer end of said actuating arm positioned to be raised by the vertical movement of the operating arm, a spring propelled actuator bar positioned to engage with the actuating arm when the latter is in its raised position, links on which said actuator bar is suspended, a spring for advancing the actuator bar operative on said links, means for normally retaining the actuator bar in a retracted position in opposition to the spring, and means operated by the upward movement of the actuating arm for releasing the actuator bar to permit it to move forward and act on the actuating arm and thereby rock the type bar on its pivot.

20. The combination of a key lever, a vertically movable operating arm pivoted thereto, a stationary segment, a slot in the segment in which the operating arm is guided, yieldable means for normally retaining the upper end of the operating arm below the upper surface of the segment, a pivoted type bar, an actuating arm pivoted thereon, the outer end of said actuating arm positioned to be raised by the vertical movement of the operating arm, a spring propelled actuator bar positioned to engage with the actuating arm when the latter is in its raised position, links on which said actuator bar is suspended, a spring for advancing the actuator bar operative on said links, means for normally retaining the actuator bar in a retracted position in opposition to the spring, comprising a link connected at one end to the actuator bar, a loose crank to which the other end of the link is pivoted, and means for temporarily blocking the crank against movement.

21. The combination of a key lever, a vertically movable operating arm pivoted thereto, a stationary segment, a slot in the segment in which the operating arm is guided, yieldable means for normally retaining the upper end of the operating arm below the upper surface of the segment, a pivoted type bar, an actuating arm pivoted thereon, the outer end of said actuating arm positioned to be raised by the critical movement of the operating arm, a spring propelled actuator bar positioned to engage with the actuating arm when the latter is in its raised position, links on which said actuator bar is suspended, a spring for advancing the actuator bar operative on said links, means for normally retaining the actuator bar in a retracted position in opposition to the spring, comprising a link connected at one end to the actuator bar, a loose crank to which the other end of the link is pivoted, means for temporarily blocking the crank against movement consisting of a dog, and means operated by the upward movement of the operating arm for disengaging the dog from the loose crank to permit the actuator bar to advance.

22. The combination of a key lever, a vertically movable operating arm pivoted thereto, a stationary segment, a slot in the segment in which the operating arm is guided, yieldable means for normally retaining the upper end of the operating arm below the upper surface of the segment, a pivoted type bar, an actuating arm pivoted thereon, the outer end of said actuating arm positioned to be raised by the vertical movement of the operating arm, a spring propelled actuator bar positioned to engage with the actuating arm when the latter is in its raised position, links on which said actuator bar is suspended, a spring for advancing the actuator bar operative on said links, means for normally retaining the actuator bar in a retracted position in opposition to the spring, comprising a link connected at one end to the actuator bar, a loose crank to which the other end of the link is pivoted, means for temporarily blocking the crank against movement consisting of a dog, means operated by the upward movement of the operating arm for disengaging the dog from the loose crank to permit the actuator bar to advance, and motor driven means for retracting the actuator bar in opposition to the spring.

23. The combination of a key lever, a vertically movable operating arm pivoted thereto, a stationary segment, a slot in the segment in which the operating arm is guided, yieldable means for normally retaining the upper end of the operating arm below the upper surface of the segment, a pivoted type bar, an actuating arm pivoted thereon, the outer end of said actuating arm positioned to be raised by the vertical movement of the operating arm, a spring propelled actuator bar positioned to engage with the actuating arm when the latter is in its raised position, links on which said actuator bar is suspended, a spring for advancing the actuator bar operative on said links, means for normally retaining the actuator bar in a retracted position in opposition to the spring, comprising a link connected at one end to the actuator bar, a loose crank to which the other end of the link is pivoted, means for temporarily blocking the crank against movement consisting of a dog, means operated by the upward movement of the operating arm for disengaging the dog from the loose crank to permit the actuator bar to advance, and motor driven means acting on the crank for retracting the actuator bar.

24. The combination of a key lever, a vertically movable operating arm pivoted thereto, a stationary segment, a slot in the segment in which the operating arm is guided, yieldable means for normally retaining the upper end of the operating arm below the upper surface of the segment, a pivoted type bar, an actuating arm pivoted thereon, the outer end of said actuating arm positioned to be raised by the vertical movement of the operating arm, a spring propelled actuator bar positioned to engage with the actuating arm when the latter is in its raised position, links on which said actuator bar is suspended, a spring for advancing the actuator bar operative on said links, means for normally retaining the actuator bar in a retracted position in opposition to the spring, comprising a link connected at one end to the actuator bar, a loose crank to which the other end of the link is pivoted, means for temporarily blocking the crank against movement consisting of a dog, means operated by the upward movement of the operating arm for disengaging the dog from the loose crank to permit the actuator bar to advance, motor driven means acting on the crank for retracting the actuator bar, including a pawl mounted on the crank, a continuously revoluble shaft, and a ratchet on the shaft with which the pawl is engageable.

25. The combination of a key lever, a vertically movable operating arm pivoted thereto, a stationary segment, a slot in the segment in which the operating arm is guided, yieldable means for normally retaining the upper end of the operating arm below the upper surface of the segment, a pivoted type bar, an actuating arm pivoted thereon, the outer end of the said actuating arm positioned to be raised by the vertical movement of the operating arm, a spring propelled actuator bar positioned to engage with the actuating arm when the latter is in its raised position, links on which said actuator bar is suspended, a spring for advancing the actuator bar operative on said links, means for normally retaining the actuator bar in a retracted position in opposition to the spring, comprising a link connected at one end to the actuator bar, a loose crank to which the other end of the link is pivoted, means for temporarily blocking the crank against movement, consisting of a dog, means operated by the upward movement of the operating arm for disengaging the dog from the loose crank to permit the actuator bar to advance, motor driven means acting on the crank for retracting the actuator bar, including a pawl mounted on the crank, a continuously revoluble shaft, a ratchet on the shaft with which the pawl is engageable, and means whereby the pawl is held out of engagement with the ratchet on the forward movement of the actuator bar arranged to permit the pawl to engage the ratchet on the end of the forward stroke of the actuator bar to cause the crank to rotate with the ratchet to retract the actuator bar.

26. The combination of key lever, a vertically movable operating arm pivoted thereto, a stationary segment, a slot in the segment in which the operating arm is guided, yieldable means for normally retaining the upper end of the operating arm below the upper surface of the segment, a pivoted type bar, an actuating arm pivoted thereon, the outer end of the said actuating arm positioned to be raised by the vertical movement of the operating arm, a spring propelled actuator bar positioned to engage with the actuating arm when the latter is in its raised position, links on which said actuator bar is suspended, a spring for advancing the actuator bar operative on said links, means for normally retaining the actuator bar in a retracted position in opposition to the spring, comprising a link connected at one end to the actuator bar, a loose crank to which the other end of the link is pivoted, means for temporarily blocking the crank against movement, consisting of a dog, means operated by the upward movement of the operating arm for disengaging the dog from the loose crank to permit the actuator bar to advance, motor driven means acting on the crank for retracting the actuator bar, including a pawl mounted on the crank, a continuously revoluble shaft, a ratchet on the shaft with which the pawl is engageable, means whereby the pawl is held out of engagement with the ratchet on the forward movement of the actuator bar arranged to permit the pawl to engage the ratchet on the end of the forward stroke of the actuator bar to cause the crank to rotate with the ratchet to retract the actuator bar, means for causing the dog to reengage the crank on the end of the back stroke of the actuator bar, and means for disengaging the pawl from the ratchet just before the reengagement of the crank.

27. The combination of a key lever, a vertically movable operating arm pivoted thereto, a stationary segment, a slot in the segment in which the operating arm is guided, yieldable means for normally retaining the upper end of the operating arm below the upper surface of the segment, a pivoted type bar, an actuating arm pivoted thereon, the outer end of the said actuating arm positioned to be raised by the vertical movement of the operating arm, a spring propelled actuator bar positioned to engage with the actuating arm when the latter is in its raised position, links on which said actuator bar is suspended, a spring for advancing the actuator bar operative on said links, means for normally retaining the actuator bar in a retracted position in opposition to the spring, comprising a link connected at one end to the actuator bar, a loose crank to which the other end of the link is pivoted, means for temporarily blocking the crank against movement consisting of a dog, means operated by the upward movement of the operating arm for disengaging the dog from the loose crank to permit the actuator bar to advance, motor driven means acting on the crank for retracting the actuator bar, including a pawl mounted on the crank, a continuously revoluble shaft, a ratchet on the shaft with which the pawl is engageable, means whereby the pawl is held out of engagement with the ratchet on the forward movement of the actuator bar arranged to permit the pawl to engage the ratchet on the end of the forward stroke of the actuator bar to cause the crank to rotate with the ratchet to retract the actuator bar, means for causing the dog to reengage the crank on the end of the back stroke of the actuator bar, means for disengaging the pawl from the ratchet just before the reengagement of the crank, and a motor for rotating said shaft continuously.

28. In a typewriting machine, the combination of a series of type bars, an automatically operating actuator for severally actuating said bars, spring means for advancing the actuator, a selective means for the type bars, rotary motive means to retract said actuator and means for controlling the operation of the rotary motive means through the selective means.

29. In a typewriting machine, the combination of a series of type bars, a series of key levers for selecting the type bars, a release bar adapted to be operated by any one of the key levers, an actuator, spring means for advancing the actuator, means to retract the actuator, a make-and-break connection between the actuator and the means for retracting it, means connecting the release bar to said make-and-break connection, and means whereby the actuator when released will operate any selected type bar.

30. In a typewriting machine, a series of type bars, an actuator for severally moving said bars, power means for advancing the actuator for the printing action, a selective means for the type bars, motive means to retract said actuator against the power of its moving means, means to hold the actuator in retracted position, and key-controlled devices for operating the selective means and to release the means for advancing the actuator.

31. In a typewriting machine, a series of type bars, key levers, a reciprocating actuator for moving the type bars, a yieldable power means for advancing the actuator, a constantly operating motor means to retract the actuator against its moving means, means to lock the actuator in its retracted position, and means operable by any one of the keys to release the actuator.

32. In a typewriting machine, a series of type bars, key levers, a reciprocating actuator for moving the type bars, a yieldable power means for advancing the actuator, a constantly operating motor to retract the actuator against its moving means, means to lock the actuator in its retracted position, means operable by any one of the keys to release the actuator, and means to connect the actuator to the constantly operating motor when the type bar has been moved.

33. In a typewriting machine, a series of type bars, key levers, an actuator, means for reciprocating said actuator to move the type bars, said means consisting of an intermittently operating yielding subordinate power means, and a constantly operating superior power means adapted to retract the actuator against the subordinate power means, means to hold the actuator in retracted position, and means adapted to be operated by any one of the keys to release the actuator.

34. In a typewriting machine, a series of type bars, an actuator for moving said bars to the printing position, a yieldable power means for advancing the actuator for the printing action, a superior power means to retract the actuator, means for automatically breaking the connection between the actuator and the means for retracting it, means to lock the actuator in its retracted position when disconnected from the superior power means, a series of keys, means operated by said keys to release the actuator, and means for automatically connecting the actuator to the superior power means when the type bar has been moved to printing position.

35. In a typewriting machine, a series of type bars, an actuator for moving said bars to the printing position, a yieldable power means for advancing the actuator for the printing action, a constantly operating superior power means to retract the actuator, means for automatically breaking the connection between the actuator and the means for retracting it, means to lock the actuator in its retracted position when disconnected from the superior power means, a series of keys, means operated by said keys to release the actuator, and means for automatically connecting the actuator to the superior power means when the type bar has been moved to printing position.

36. In a typewriting machine, a series of type bars, a reciprocating actuator for moving said bars to the printing position, a yieldable power means for advancing the actuator for the printing action, a constantly operating rotary superior power means to retract the actuator, means for automatically breaking the connection between the actuator and the means for retracting it, means to lock the actuator in its retracted position when disconnected from the superior power means, a series of keys, means operated by said keys to release the actuator, and means for automatically connecting the actuator to the superior power means when the type bar has been moved to printing position.

37. In a typewriting machine, type bars, key levers, a type bar actuator, yieldable means for advancing the actuator, a superior power means for retracting the actuator, an automatically operating make-and-break connection between said superior power means and the actuator, means for locking the actuator in its retracted position when the connection between said two power means is broken, and a release means adapted to be operated by the said key levers.

38. In a typewriting machine, type bars, key levers, a reciprocable actuator, a self-contained constant power means for moving said actuator in one direction only, a continuously operating superior power means for moving the actuator in the opposite direction, an automatically operating make-and-break connection between said superior power means and the actuator, means for locking the actuator upon the completion of its movement by the superior power means, and means operated by the keys for releasing said locking means, the means for connecting the superior power means to the actuator operating when the actuator has completed its movement under the influence of its own power means.

39. In a typewriting machine, the combination with a series of type bars and a bank of key levers, of a reciprocating bar for actuating the type bars, means for advancing the bar, rotary means to retract the bar, means for locking the said bar in its rearmost position in opposition to its advancing means, a release bar, means connecting said release bar to the said locking means, and means operated by the key levers for moving the release bar and operatively connecting the type bars to the actuator bar.

40. In a typewriting machine, type bars, key levers, a type bar actuator, an independent power means for advancing the actuator, an additional power means for retracting the actuator, an automatically operating make-and-break connection between said additional power means and the actuator, means for locking the actuator in its retracted position when the connection between said additional power means and the actuator is broken, and a release means adapted to be operated by said key levers.

41. In a typewriting machine, type bars, key levers, a type bar actuator, an independent constant spring power means for advancing the actuator, an additional superior power means for retracting the actuator, an automatically operating make-and-break connection between said additional power means and the actuator, means for locking the actuator in its retracted position when the connection between said additional power means and the actuator is broken, and a release means adapted to be operated by said key levers.

42. In a typewriting machine, a series of type bars, an actuator for moving said bars to the printing position, a yieldable power means for advancing the actuator for the printing action, a constantly operating superior power means to retract the actuator, means for automatically breaking the connection between the actuator and the means for retracting it, means to lock the actuator in its retracted position when disconnected from the superior power means, a series of keys, a type bar actuating arm connected to each of the type bars, means adapted to be operated by said keys to move said type bar actuating arms to release the actuator and also place said arms in position to be engaged by the actuator, and means for automatically connecting the actuator to the superior power means when the type bar has been moved to printing position.

43. The combination with a series of type bars and a bank of key levers, of a reciprocating bar for actuating the type bars, spring means for advancing the bar, a continuously-running rotary motor, means adapted to be actuated by said motor to retract the bar said latter means operating irrespective of the position of the key-lever last actuated, and means for locking the bar in its rearmost position in opposition to the spring advancing means, said locking means operating automatically and irrespective of the position of the key-lever last actuated.

44. In a typewriting machine, the combination of a series of type bars, a series of key levers for selecting the type bars, an actuator, means whereby the actuator will move any selected type bar, spring means for advancing the actuator, a rotary motor, means operated at the completion of the working stroke of the actuator to connect the actuator to the rotary motor, means operating automatically to disconnect the actuator from the motor when the actuator is retracted, and means for automatically locking the actuator in its retracted position when disconnected from the motor.

45. In a typewriting machine, a motor-driven mechanism for actuating the printing instrumentalities, a latch for holding said mechanism out of action, a curved swinging bail for releasing said latch, and a bank of key-levers provided each with a bar for operating said swinging bail, these bars being arranged across the machine in a row in line with said bail.

46. In a typewriting machine, a motor-driven mechanism for actuating the printing instrumentalities, a latch for holding said mechanism out of action, a curved swinging bail for releasing said latch, and a bank of key-levers having associated with each lever a device for operating said swinging bail, these devices being arranged across the machine in a row in line with said bail.

47. In a typewriting machine, a power-driven type-bar actuator frame embodying a curved actuating bar and a plurality of parallel suspending links, for the purpose set forth.

48. In a typewriting machine, a type-basket each of whose type-bars is provided with a rearwardly-extending coupler, a spring-driven actuator frame embodying a curved actuator-bar and a plurality of parallel suspending links, whereby the actuator-bar will have a body movement fore and aft, and means for shifting the couplers into the path of the actuator-bar.

49. In a power typewriting machine, a power plant embodying a continuously-running shaft carrying a ratchet-wheel, a spring-actuated universal type-bar-actuator, a retracting mechanism for the actuator embodying a pawl and means whereby this pawl is caused to engage the ratchet-wheel in the retractive operation and to be disengaged from the ratchet-wheel upon completion of said operation, and tripping mechanism actuatable from any one of the keys.

50. In a power typewriter, a universal actuator and a spring for moving it on its working stroke, a retracting mechanism embodying a continuously-rotated shaft carrying a ratchet-wheel, a crank pivoted concentrically with said shaft and connected to the actuator, a pawl carried by this arm, and means whereby the pawl is caused to engage the ratchet-wheel for retracting the actuator and to be disengaged therefrom when this operation is completed.

51. In a power typewriter, a universal actuator and a spring for moving it on its working stroke, a retracting mechanism embodying a continuously-rotated shaft carrying a ratchet-wheel, a crank pivoted concentrically with said shaft and connected to the actuator, a pawl carried by this arm, and means whereby the pawl is caused to engage the ratchet-wheel for retracting the actuator and to be disengaged therefrom when this operation is completed, said means embodying a stationary cam adapted to engage the pawl.

In testimony whereof I hereunto affix my signature.

MANSFIELD C. CRAWLEY.